US009266411B2

United States Patent
Shimizu et al.

(10) Patent No.: US 9,266,411 B2
(45) Date of Patent: Feb. 23, 2016

(54) VEHICLE DOOR FRAME STRUCTURE

(71) Applicant: SHIROKI CORPORATION, Fujisawa-Shi, Kanagawa (JP)

(72) Inventors: Kenji Shimizu, Fujisawa (JP); Shigenobu Ohsawa, Fujisawa (JP); Jiro Yoshihara, Fujisawa (JP)

(73) Assignee: SHIROKI CORPORATION, Fujisawa-Shi (JP)

( * ) Notice: Subject to any disclaimer, the term of this patent is extended or adjusted under 35 U.S.C. 154(b) by 0 days.

(21) Appl. No.: 14/415,309

(22) PCT Filed: Jul. 11, 2013

(86) PCT No.: PCT/JP2013/068937
§ 371 (c)(1),
(2) Date: Jan. 16, 2015

(87) PCT Pub. No.: WO2014/013926
PCT Pub. Date: Jan. 23, 2014

(65) Prior Publication Data
US 2015/0183306 A1    Jul. 2, 2015

(30) Foreign Application Priority Data

Jul. 17, 2012   (JP) ................................. 2012-158981

(51) Int. Cl.
*B60J 5/04*    (2006.01)
(52) U.S. Cl.
CPC .............. *B60J 5/0411* (2013.01); *B60J 5/0426* (2013.01); *B60J 5/0437* (2013.01); *B60J 5/0443* (2013.01)
(58) Field of Classification Search
CPC ...... B60J 5/0416; B60J 5/0411; B60J 5/0443; B60J 5/0426

USPC .............................. 296/187.12, 146.6, 146.5
IPC ........................................................... B60J 5/04
See application file for complete search history.

(56) References Cited

U.S. PATENT DOCUMENTS

| 6,450,565 | B2 * | 9/2002  | Yamamoto | B60J 5/0426 |
|           |      |         |          | 296/146.5   |
| 7,448,670 | B2 * | 11/2008 | Baker    | B60J 5/0411 |
|           |      |         |          | 296/146.2   |
| 7,566,091 | B2 * | 7/2009  | Yagi     | 296/146.6   |
| 8,418,408 | B2 * | 4/2013  | Yasuhara et al. | 49/502 |

(Continued)

FOREIGN PATENT DOCUMENTS

| DE | 19947209 A1   | 3/2000  |
| JP | 2002-337548 A | 11/2002 |

(Continued)

OTHER PUBLICATIONS

International Search Report dated Aug. 13, 2013 issued in corresponding PCT/JP2013/068937 application (pp. 1-2).

(Continued)

*Primary Examiner* — Pinel Romain
(74) *Attorney, Agent, or Firm* — Millen, White, Zelano & Branigan, P.C.

(57) ABSTRACT

A door frame is provided with a first fixed portion and a second fixed portion to which one end and the other end of a beltline reinforcement, with respect to the lengthwise direction thereof, are fixed, respectively; the first fixed portion is provided with a lengthwise-direction position limit portion which is positioned on an extension of the beltline reinforcement in the lengthwise direction thereof and faces against the one end of the beltline reinforcement, the second fixed portion is provided with a thickness directional position limit portion which overlaps the other end of the beltline reinforcement in the door thickness direction, and the lengthwise-direction position limit portion and the thickness directional position limit portion are fixed to the corresponding ends of the beltline reinforcement by welding.

13 Claims, 5 Drawing Sheets

(56) References Cited

U.S. PATENT DOCUMENTS

| | | | |
|---|---|---|---|
| 8,727,420 B2* | 5/2014 | Yasuhara et al. | 296/146.6 |
| 2004/0123526 A1* | 7/2004 | Hock | B60J 5/0402 49/502 |
| 2007/0267889 A1* | 11/2007 | Flendrig et al. | 296/146.6 |
| 2011/0023373 A1* | 2/2011 | Yasuhara et al. | 49/502 |
| 2011/0302846 A1 | 12/2011 | Okada et al. | |

FOREIGN PATENT DOCUMENTS

| | | |
|---|---|---|
| JP | 2006-69345 A | 3/2006 |
| JP | 2009-23473 A | 2/2009 |
| JP | 2011-255850 A | 12/2011 |

OTHER PUBLICATIONS

English Translation Abstract of DE 19947209 A1 published Mar. 16, 2000.

English Translation Abstract of JP 2002-337548 A published Nov. 27, 2002.

English Translation Abstract of JP 2006-069345 A published Mar. 16, 2006.

English Translation Abstract of JP 2009-023473 published Feb. 5, 2009.

English Translation Abstract of 2011-255850 published Dec. 22, 2011.

* cited by examiner

VEHICLE DOOR FRAME STRUCTURE

TECHNICAL FIELD

The present invention relates to a vehicle door frame structure.

BACKGROUND ART

In vehicle door frames provided with a beltline reinforcement at a lower part of a door sash constituting a window frame, one end and the other end of the beltline reinforcement are fixed to the irrespective brackets by welding, and each bracket is fixed to the door sash and a door panel (inner panel).

CITATION LIST

Patent Literature

Patent Literature 1: Japanese Unexamined Patent Publication No. 2011-255850

SUMMARY OF INVENTION

Technical Problem

In conventional vehicle door frames, each end beltline reinforcement is made to overlap, in the door thickness direction (vehicle widthwise direction), the associated bracket and welded along an edge of the overlapped portion. Therefore, the position of the beltline reinforcement can be easily defined in the door thickness direction; however, the position of the beltline reinforcement easily changes in the lengthwise direction thereof (in the forward/rearward direction in the case of a side door), and there has been a problem with it taking time and effort to secure mounting accuracy of the beltline reinforcement.

The present invention has been devised in view of the above described problems and provides a vehicle door frame structure which is easy to secure mounting accuracy of the beltline reinforcement and is superior in productivity.

Solution to Problem

In a vehicle door frame structure having a door frame and a beltline reinforcement, the present invention is characterized by the door frame including a first fixed portion and a second fixed portion to which one end and the other end of the beltline reinforcement, with respect to a lengthwise direction thereof, are fixed, respectively. The first fixed portion includes a lengthwise-direction position limit portion which is positioned on an extension of the beltline reinforcement in the lengthwise direction and faces against the one end of the beltline reinforcement, the lengthwise-direction position limit portion and the one end of the beltline reinforcement being fixed together by welding. The second fixed portion includes a thickness directional position limit portion which is adjacent to the other end of the beltline reinforcement in a door thickness direction, the thickness directional position limit portion and the other end of the beltline reinforcement being fixed together by welding.

It is advisable for the door frame to include a door sash which projects from a door panel, serving as a door component, and a bracket which fixes the door sash to the door panel, and for the lengthwise-direction position limit portion to be formed from part of the door sash and the thickness directional position limit portion is formed from part of the bracket. More specifically, the door sash can include an upright pillar sash which extends in a vertical direction and an upper sash which forms a door upper edge, and the lengthwise-direction position limit portion can be formed on a portion of the upright pillar sash which is inserted into the door panel.

It is desirable for each of the lengthwise-direction position limit portion and the thickness directional position limit portion to be welded to the beltline reinforcement at at least two different locations in a vertical direction.

The beltline reinforcement can be shaped to include a box-shaped sectional portion and a plate-like portion which projects in the vertical direction from the box-shaped sectional portion. In this case, it is desirable, strength-wise, for the thickness directional position limit portion to adjoin to and overlap an outer surface of the box-shaped sectional portion, and a corner of the box-shaped sectional portion and the thickness directional position limit portion to be welded together.

Advantageous Effects of Invention

According to the present invention described above, the beltline reinforcement can be easily positioned with high precision relative to the door frame in the lengthwise direction of the beltline reinforcement and the door thickness direction, which makes it possible to improve productivity of the vehicle door frame.

DESCRIPTION OF EMBODIMENTS

Figure 1:
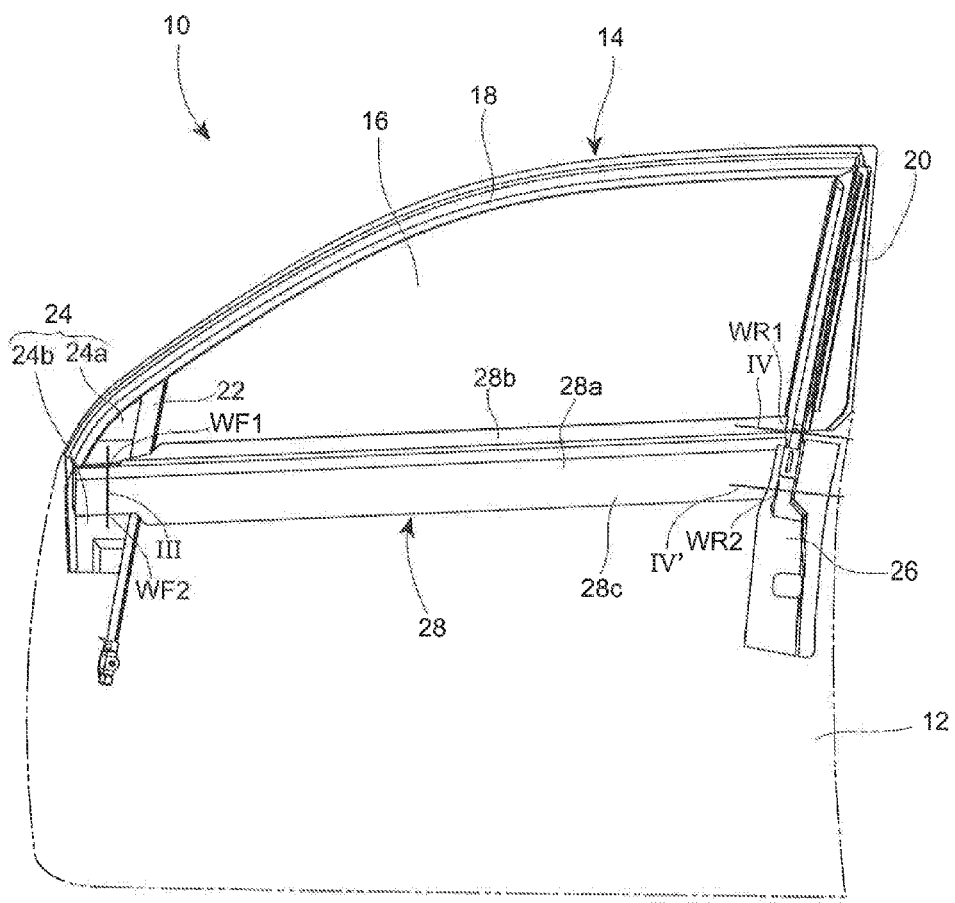
FIG. 1 is a side elevational view of a side door for a front seat of a vehicle to which a door frame structure according to the present invention is applied, viewed from the vehicle interior side.
Figure 2:
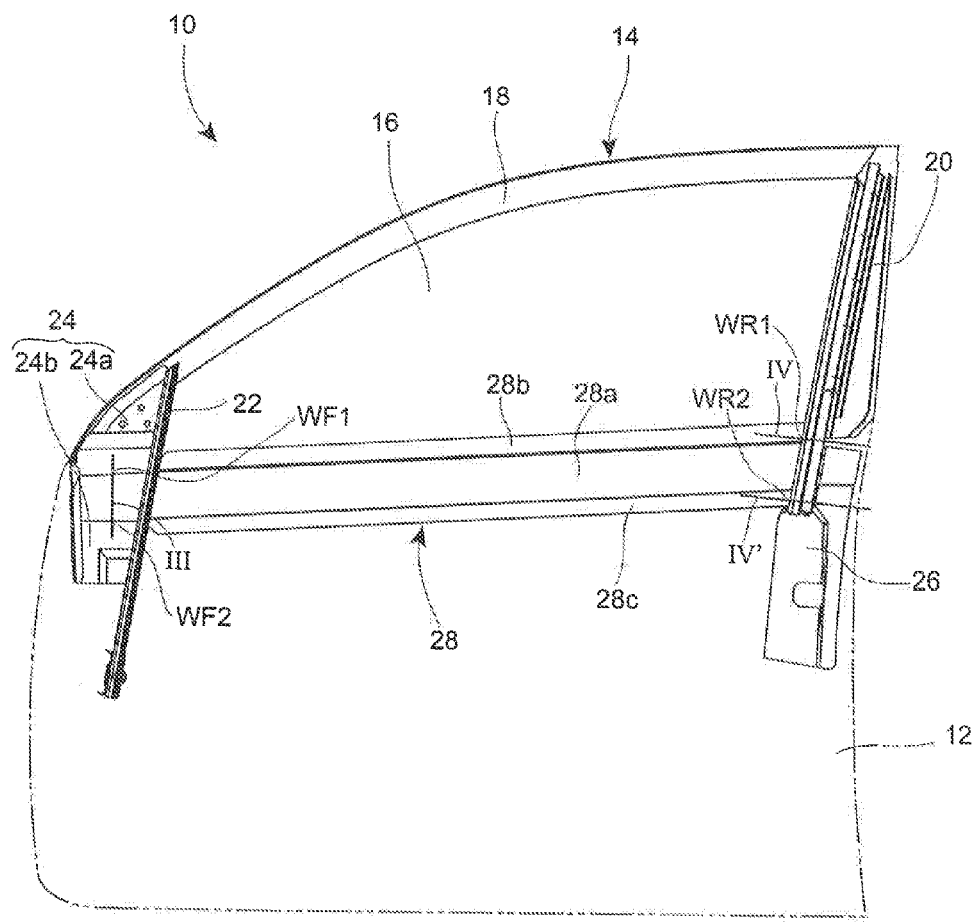
FIG. 2 is a side elevational view of a side door, viewed from the vehicle exterior side.

FIGS. 1 and 2 show side doors 10 for front seat of a vehicle. FIG. 1 shows a diagram showing a right side door 10, viewed from the vehicle interior side, and FIG. 2 is a diagram showing a left side door 10, viewed from the vehicle exterior side. In the following descriptions, the directional expressions such as the forward/rearward direction, the upward/downward direction, the vehicle interior side and the vehicle exterior side refer to directions defined with reference to the vehicle body, to which each door 10 is fixed. The door 10 is provided with a door panel 12, the schematic shape of which is shown by a two-dot chain line, and a door frame 14 which is formed into a frame shape above the door panel 12, and a door glass (not shown) moves up and down in a window opening 16 which is surrounded by the upper edge of the door panel 12 and the inner edge of the door frame 14. A glass run (not shown) made of an elastic material is disposed on the inner peripheral side of the door frame 14 that faces the window opening 16, and an edge of the door glass is held by the glass run.

The door frame 14 is provided with an upper sash 18 which forms the upper edge of the door, an upright pillar sash (first fixed portion) 20 which extends upward from the rear of the door panel 12, and a front side sash 22 which extends downward from a near-front position of the upper sash 18, and the rear end of the upper sash 18 and the upper end of the upright pillar sash 20 are joined at a door corner. The door panel 12 is configured of a combination of an outer panel on the vehicle exterior side and an inner panel on the vehicle interior side, a front lower part of the upper sash 18 and the front side sash 22 are fixed to the inner panel via a mirror bracket (second fixed portion) 24, and a lower part of the upright pillar sash 20 is fixed to the inner panel via a lock bracket 26. The mirror bracket 24 and the lock bracket 26 are also components of the door frame 14. When the door 10 is closed, the upper sash 18 is positioned along a door opening of the roof panel (not shown) of the vehicle body and the upright pillar sash 20 is positioned along a center pillar of the vehicle body. A weather strip (not shown) made of an elastic material is installed onto the outer peripheral sides of the upper sash 18 and the upright pillar sash 20, and is elastically deformed to seal the gap between the door 10 and the vehicle body in a water tight fashion when the door 10 is closed. A beltline reinforcement 28 which extends in the vehicle forward/rearward direction is fixed to a lower part of the door frame 14.

Each part of the door frame 14 and the beltline reinforcement 28 are formed as aluminum molded products. The beltline reinforcement 28 is provided with a hollow box-shaped sectional portion 28a, and a plate-like upper-edge flange portion (plate-like portion) 28b and a plate-like lower-edge flange portion (plate-like portion) 28c which extend upward and downward from the box-shaped sectional portion 28a, respectively. In an area of the front of the beltline reinforcement 28 which overlaps the mirror bracket 24, the upper-edge flange portion 28b and the lower-edge flange portion 28c are partly removed (see FIGS. 1 and 3).

Figure 3:
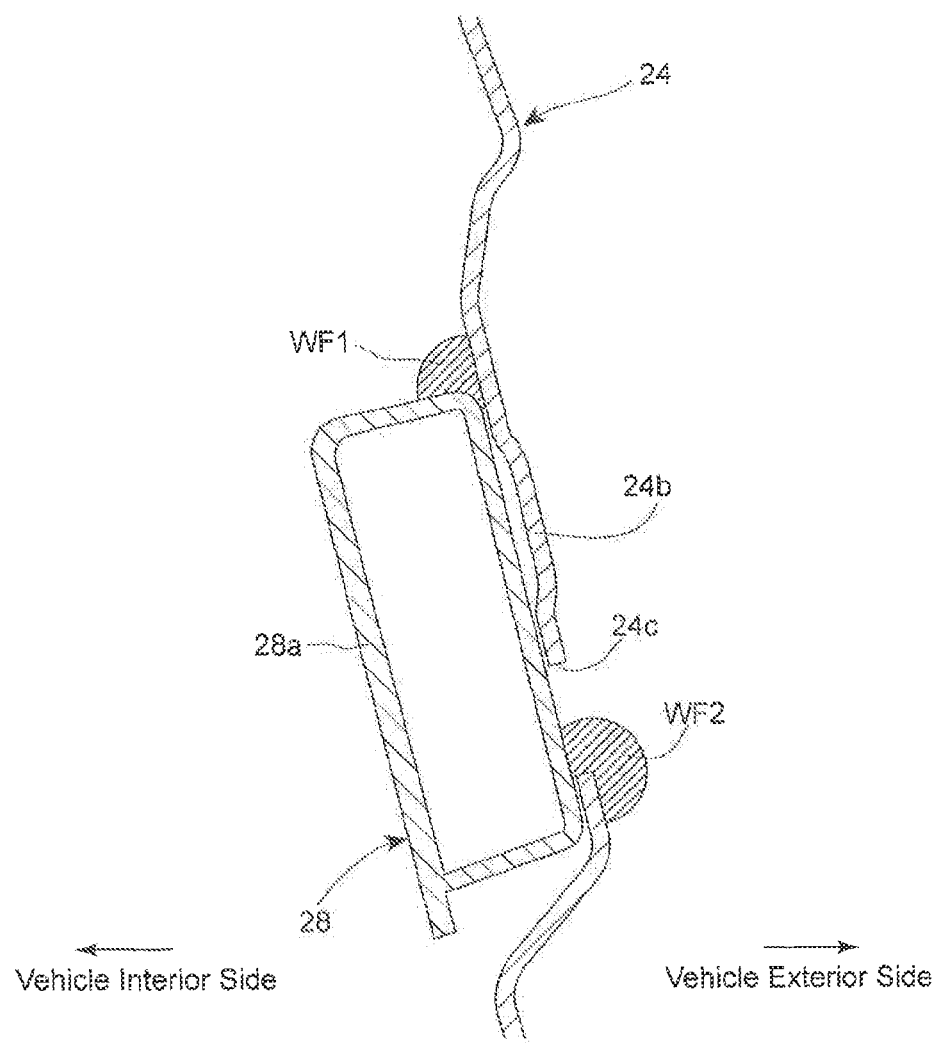
FIG. 3 is a sectional view taken along the line III shown in FIGS. 1 and 2.

The mirror bracket 24 is a plate-like member extending vertically across the front end position of the beltline reinforcement 28 and is provided, in an area surrounded by the upper sash 18 and the front side sash 22, with a mirror mounting portion 24a to which a door mirror is fixed. The mirror bracket 24 is provided, below the mirror mounting portion 24a, with a support plate portion (thickness directional position limit portion) 24b which overlaps a side of the box-shaped sectional portion 28a of the beltline reinforcement 28. The support plate portion 24b is fixed to the inner panel which forms part of the door panel 12. As shown in FIG. 3, a welding hole 24c is formed through the support plate portion 24b in the thickness direction of the door 10 (the vehicle widthwise direction).

The lower portion of the upright pillar sash 20 is partly inserted into the door panel 12, and this inserted portion of the upright pillar sash 20 into the door panel 12 extends downward through a position facing the rear end of the beltline reinforcement 28. The lock bracket 26 is fixed to a portion of the upright pillar sash 20, in the vicinity of the lower end thereof, and the inner panel which forms part of the door panel 12. As shown in the cross-sectional view in FIG. 4, the upright pillar sash 20 is configured of a combination of a glass run channel 30 and an outer member 32. The glass run channel 30 is provided with a glass run holding portion 30a which is open toward the inner peripheral side of the door frame 14 to allow a glass run to be fitted and held therein. The outer member 32 is provided with a pocket-like sectional portion 32a which projects toward the vehicle interior side with respect to the glass run holding portion 30a.

The beltline reinforcement 28 is fixed in such a manner as to define the position thereof in the forward/rearward direction (the lengthwise direction of the beltline reinforcement 28) with respect to the upright pillar sash 20 and to define the position of the beltline reinforcement 28 in the thickness direction of the door 10 with respect to the mirror bracket 24 (the plate-thickness direction of the beltline reinforcement 28).

Figure 4:
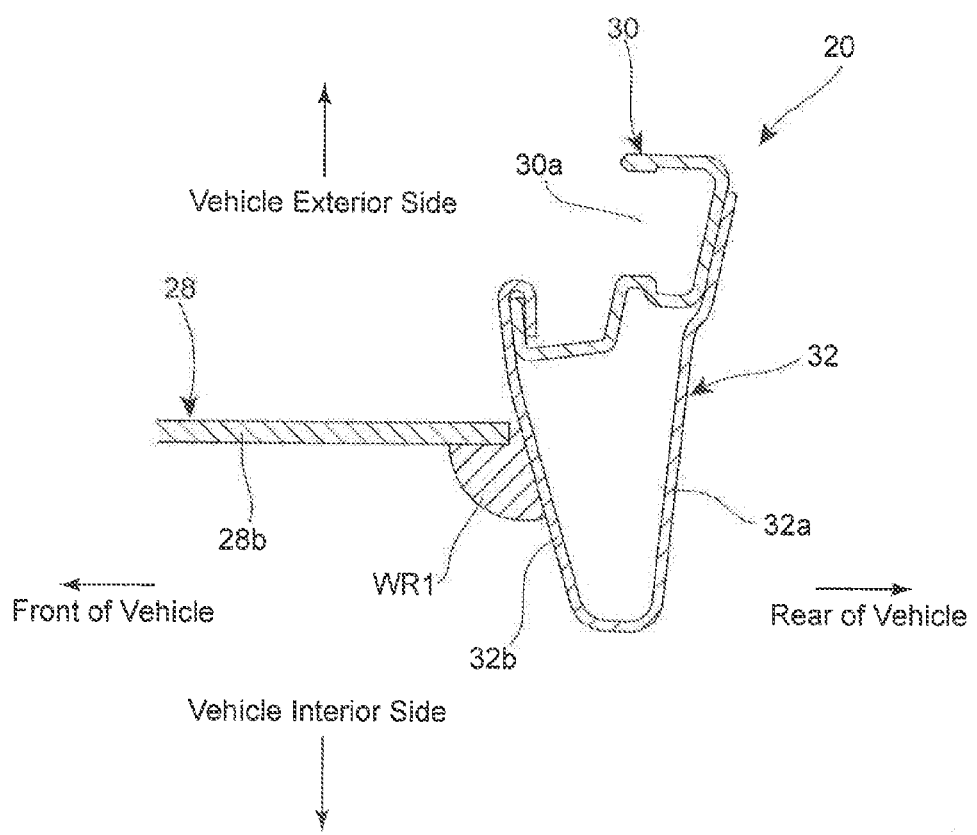
FIG. 4 is a sectional view taken along the line IV shown in FIGS. 1 and 2.

The relationship between the rear end of the beltline reinforcement 28 and the upright pillar sash 20 is shown in FIG. 4. The pocket-like sectional portion 32a of the outer member 32 that serves as a component of the upright pillar sash 20 is provided with a retaining surface (first fixed portion) 32b which faces forward, and the rear end of the upper-edge flange portion 28b of the beltline reinforcement 28 faces the retaining surface 32b. The retaining surface 32b is a surface intersecting the lengthwise direction of the beltline reinforcement 28, and the rear end position of the beltline reinforcement 28 is defined by the retaining surface 32b. In addition, the rear end of the upper-edge flange portion 28b and the retaining surface 32b of the outer panel 32 are welded with a weld WR1, as shown in FIG. 4. To absorb an error in the lengthwise direction of the beltline reinforcement 28, a predetermined design clearance is secured between the rear end of the upper-edge flange portion 28b and the retaining surface 32b. Although FIG. 4 shows the fixed relationship between the upper-edge flange portion 28b of the beltline reinforcement 28 and the upright pillar sash 20 at the position of a section IV shown in FIGS. 1 and 2, the lower-edge flange portion 28c of the beltline reinforcement 28 is fixed to the upright pillar sash 20 (the retaining surface 32b) by welding by a similar configuration also at the position of a section IV' shown in FIGS. 1 and 2. This welded area between the lower-edge flange portion 28c and the upright pillar sash 20 is designated by WR2 in FIGS. 1 and 2.

The position of the beltline reinforcement 28 in the lengthwise direction (forward/rearward direction) is defined by defining the rear end position of the beltline reinforcement 28 by the upright pillar sash 20. Additionally, the front end side of the beltline reinforcement 28 is fixed to the mirror bracket 24. Unlike the retaining surface 32b of the upright pillar sash 20, the support plate portion 24b of the mirror bracket 24 is a surface extending along the lengthwise direction of the beltline reinforcement 28, and the support plate portion 24b and the beltline reinforcement 28 overlap each other in the thickness direction of the door 10, as shown in FIG. 3. Accordingly, the position of the beltline reinforcement 28 in the thickness direction of the door 10 is defined by the support plate portion 24b of the mirror bracket 24; however, the beltline reinforcement 28 has a degree of freedom in setting the position thereof in the forward/rearward direction. Additionally, as shown in FIG. 3, the box-shaped sectional portion 28a of the beltline reinforcement 28 and the support plate portion 24b of the mirror bracket 24 are fixed by welding at welds WF1 and WF2. Weld WF1 is a weld between a surface of the support plate portion 24b which faces toward the vehicle interior side and an upper corner of the box-shaped sectional portion 28a and weld WF2 is a weld between the welding hole 24c, which is formed in the support plate portion 24b, and the box-shaped sectional portion 28a.

The welds WF1, WF2, WR1 and WR2 of the beltline reinforcement 28 to the door frame 14 are conceptually shown in FIGS. 1 and 2. Each of these portions is welded by arc welding. Welding the beltline reinforcement 28 at four corners: the upper and lower front end corners and the upper and lower rear end corners, makes it possible to secure a reliable positional accuracy and a high fixing strength. It is possible to perform an additional welding operation at locations other than these four locations.

Since the beltline reinforcement 28 is supported in a manner such that the rear end thereof faces a lower part of the upright pillar sash 20, which serves as the first fixed portion on the door frame 14 side, when the beltline reinforcement 28 is mounted to the door frame 14, the position of the beltline reinforcement 28 in the lengthwise direction thereof is easily and securely defined. In addition, since the beltline reinforcement 28 is supported in a manner to overlap the mirror bracket 24, which serves as the second fixed portion on the door frame 14 side, the position of the beltline reinforcement 28 in the door thickness direction that is orthogonal to the lengthwise direction thereof can also be easily and securely defined. This improves the mounting workability of the beltline reinforcement 28. Although the position of the beltline reinforcement 28 in the door thickness direction relative to the mirror bracket 24 that is positioned in front of the beltline reinforcement 28 and the position of the beltline reinforcement 28 in the lengthwise direction thereof relative to the upright pillar sash 20 that is positioned at the rear of the beltline reinforcement 28 are defined, it is possible to reverse the front/rear relationship; namely, it is possible for the position of the beltline reinforcement 28 in the lengthwise direction thereof to be defined on the front end side of the beltline reinforcement 28 and for the position of the beltline reinforcement 28 in the door thickness direction to be defined at the rear end side of the beltline reinforcement 28. Additionally, although the mirror bracket 24 and the upright pillar sash 20 are used as front and rear fixed portions which are welded to the beltline reinforcement 28, the fixed portions to which the beltline reinforcement 28 is fixed can be arbitrary members as long as the condition that these members are components of the door frame is satisfied. For instance, it is also possible to fix the beltline reinforcement 28 to the lock bracket 26 instead of the upright pillar sash 20.

Figure 5:
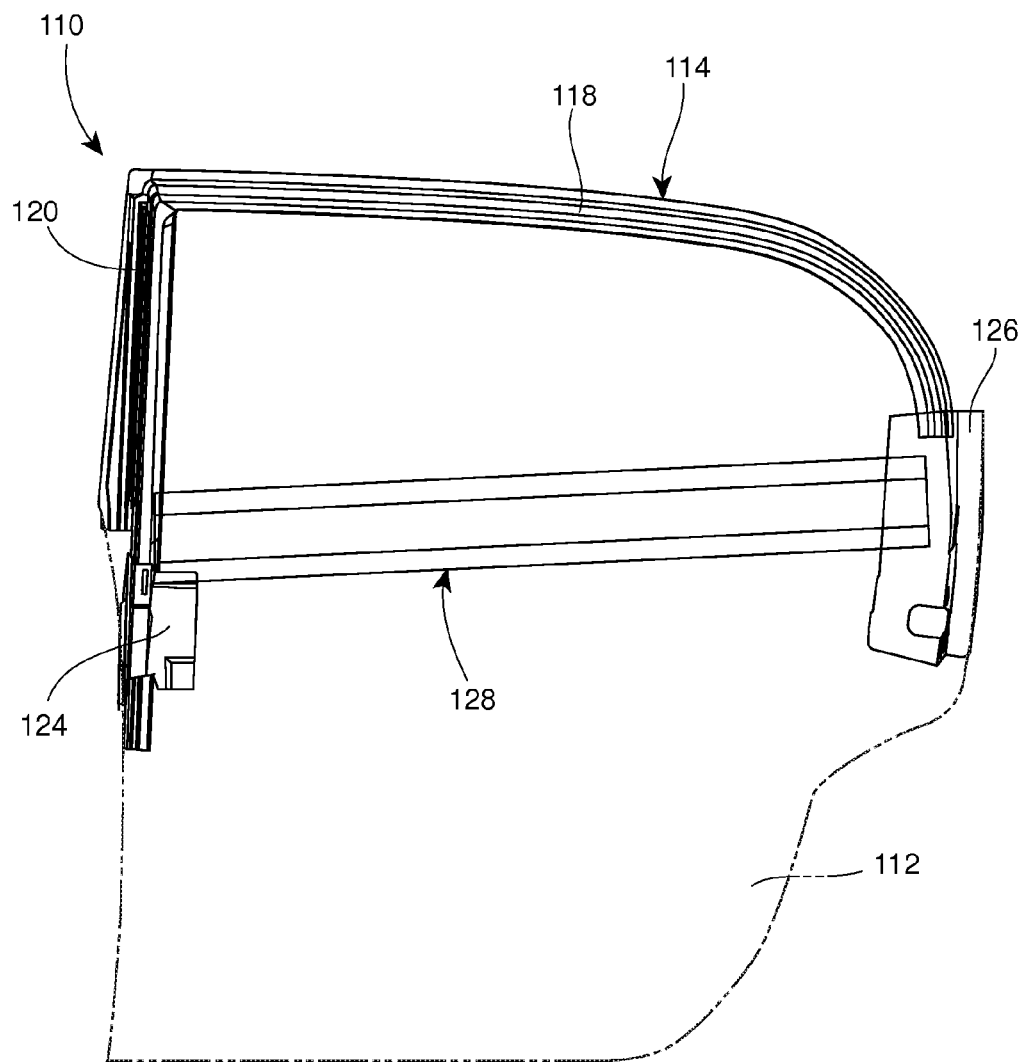
FIG. 5 is a side elevational view of a side door for a rear seat of a vehicle to which a door frame structure according to the present invention is applied, viewed from the vehicle interior side.

Although the above described embodiment is directed to the side door 10 for use as a vehicle front seat to which the present invention has been applied, the present invention can also be applied to a side door 110 shown in FIG. 5 that is for use as a vehicle rear seat. The door 110 is provided with a door panel 112 and a door frame 114, and the door frame 114 is composed of an upper sash 118 which forms the upper edge of the door, an upright pillar sash (first fixed portion) 120 which extends upward from the front of the door panel 112, a front bracket 124 which is fixed to a lower part of the upright pillar sash 120, and a rear bracket (second fixed portion) 126 which is connected to the lower rear end of the upper sash 118. The position of a beltline reinforcement 128 in the lengthwise direction thereof is defined with the front end of the beltline reinforcement 128 facing a retaining surface formed on the upright pillar sash 120, and the rear end position of the beltline reinforcement 128 in the door thickness direction is defined with the rear end of the beltline reinforcement 128 overlapping the rear bracket 126. Mounting of the beltline reinforcement 128 is completed by forming a weld between the beltline reinforcement 128 and the upright pillar sash 120 and a weld between the beltline reinforcement 128 and the rear bracket 126. Similar to the case of the above described door 10 for a front seat, the portions the positions of which are to be defined can be reversed also in the door 110 for a rear seat. Namely, it is possible for the position of the beltline reinforcement 128 in the lengthwise direction to be defined at the rear end thereof (at the rear bracket 126 side) and for the position of the beltline reinforcement 128 in the door thickness direction to be defined at the front end thereof (the upright pillar sash 120 or the front bracket 124 side).

Although the present invention has been illustrated based on the above illustrated embodiments, the present invention is not limited thereto; various modifications can be made without departing from the gist of the invention. For instance, the components constituting the door frames 14 and 114 and the beltline reinforcements 28 and 128 of the above illustrated embodiments are each made of aluminum; however, the present invention can also be applied to a door frame made of a different material such as iron.

INDUSTRIAL APPLICABILITY

As detailed above, in the vehicle door frame structure according to the present invention, the doorframe is provided with a first fixed portion and a second fixed portion to which one end and the other end of the beltline reinforcement in the lengthwise direction thereof are fixed, respectively, and the beltline reinforcement is fixed by welding with the position of the beltline reinforcement in the lengthwise direction thereof defined by the lengthwise-direction position limit portion in the first fixed portion while the beltline reinforcement is fixed by welding with the position of the beltline reinforcement in the door thickness direction defined by the thickness directional position limit portion in the second fixed portion. This makes it possible to position the beltline reinforcement in the lengthwise direction thereof and the door thickness direction relative to the door frame easily with high precision, thus contributing to an improvement in productivity of door frames provided with a beltline reinforcement.

REFERENCE SIGN LIST 10 110 Door
12 112 Door panel
14 114 Door frame
16 Window opening
18 118 Upper sash
20 120 Upright pillar sash (first fixed portion)
22 Front side sash
24 Mirror bracket (second fixed portion)
24a Mirror mounting portion
24b Support plate portion (thickness directional position limit portion)
24c Welding hole
26 Lock bracket
28 128 Beltline reinforcement
28a Box-shaped sectional portion
28b Upper-edge flange portion (plate-like portion)
28c Lower-edge flange portion (plate-like portion)
30 Glass channel
30a Glass run
30a Glass run holding portion
32 Outer member
32a Pocket-like sectional portion
32b Retaining surface (lengthwise-direction position limit portion)
124 Front bracket
126 Rear bracket (second fixed portion)
WF1 WF2 WR1 WR2 Weld

The invention claimed is:

1. A vehicle door frame structure comprising a door frame and a beltline reinforcement,
wherein said door frame includes an upright pillar sash and a mirror bracket to which a rearward end and a frontward end of said beltline reinforcement, with respect to a forward-and-rearward direction thereof, are fixed, respectively, wherein said upright pillar sash includes a retaining surface which is positioned on an extension of said beltline reinforcement in said forward-and-rearward direction and faces against said rearward end of said beltline reinforcement, said retaining surface and said rearward end of said beltline reinforcement being fixed together by a first weld, and wherein said mirror bracket includes a support plate portion which is adjacent to said frontward end of said beltline reinforcement in a door thickness direction, said support plate portion and said frontward end of said beltline reinforcement being fixed together by a second weld, and a third weld.

2. The vehicle door frame structure according to claim 1, wherein said door frame comprises a door sash which projects from a door panel, serving as a door component, and a bracket which fixes said door sash to said door panel, and wherein said retaining surface is formed from part of said door sash and said support plate portion is formed from part of said bracket.

3. The vehicle door frame structure according to claim 2, wherein said door sash comprises said upright pillar sash which extends in a vertical direction and an upper sash which forms a door upper edge, and wherein said retaining surface is formed on a portion of said upright pillar sash which is inserted into said door panel.

4. The vehicle door frame structure according to claim 1, wherein each of said retaining surface and said support plate portion is welded to said beltline reinforcement at at least two different locations in a vertical direction.

5. The vehicle door frame structure according to claim 1, wherein said beltline reinforcement comprises a box-shaped sectional portion and a plate-like portion which projects in a vertical direction from said box-shaped sectional portion.

6. The vehicle door frame structure according to claim 1, wherein said retaining surface and said rearward end of said beltline reinforcement are fixed together by said first weld.

7. The vehicle door frame structure according to claim 5, wherein said support plate portion adjoins to and overlaps an outer surface of said box-shaped sectional portion, and said upper corner of said beltline reinforcement comprises a corner of said box-shaped sectional portion, wherein said corner of said box-shaped sectional portion and said support plate portion are fixed together by said second weld.

8. The vehicle door frame structure according to claim 5, wherein said support plate portion adjoins to and overlaps an outer surface of said box-shaped sectional portion, and said lower corner of said beltline reinforcement comprises a corner of said box-shaped sectional portion, wherein said corner of said box-shaped sectional portion and said support plate portion are fixed together by said third weld.

9. The vehicle door frame structure according to claim 1, wherein said second weld faces a vehicle exterior side and said third weld faces a vehicle interior side.

10. A vehicle door frame structure comprising a door frame and a beltline reinforcement, wherein said door frame includes an upright pillar sash and a rear bracket to which a rearward end and a frontward end of said beltline reinforcement, with respect to a forward-and-rearward direction thereof, are fixed, respectively, wherein said upright pillar sash includes a retaining surface which is positioned on an extension of said beltline reinforcement in said forward-and-rearward direction and faces against said rearward end of said beltline reinforcement, said retaining surface and said rearward end of said beltline reinforcement being fixed together by a first weld, and wherein said rear bracket includes a support plate portion which is adjacent to said frontward end of said beltline reinforcement in a door thickness direction, said support plate portion and said frontward end of said beltline reinforcement being fixed together by a second weld, and a third weld.

11. The vehicle door frame structure according to claim 10, wherein said retaining surface and said rearward end of said beltline reinforcement are fixed together by said first weld.

12. The vehicle door frame structure according to claim 10, wherein a surface of said support plate and an upper corner of said beltline reinforcement are fixed together by said second weld.

13. The vehicle door frame structure according to claim 10, wherein a welding hole formed in said support plate portion and a lower corner of said beltline reinforcement are fixed together by said third weld.

* * * * *